US009322365B2

(12) United States Patent
Simons

(10) Patent No.: US 9,322,365 B2
(45) Date of Patent: Apr. 26, 2016

(54) MOTOR VEHICLE EXHAUST-GAS RECIRCULATION VALVE ARRANGEMENT

(75) Inventor: Norbert Simons, Duesseldorf (DE)

(73) Assignee: PIERBURG GMBH, Neuss (DE)

( * ) Notice: Subject to any disclaimer, the term of this patent is extended or adjusted under 35 U.S.C. 154(b) by 210 days.

(21) Appl. No.: 14/006,681

(22) PCT Filed: Mar. 19, 2012

(86) PCT No.: PCT/EP2012/054777
§ 371 (c)(1),
(2), (4) Date: Nov. 22, 2013

(87) PCT Pub. No.: WO2012/126876
PCT Pub. Date: Sep. 27, 2012

(65) Prior Publication Data

US 2014/0069397 A1 Mar. 13, 2014

(30) Foreign Application Priority Data

Mar. 24, 2011 (DE) ........................ 10 2011 001 535

(51) Int. Cl.
*F02M 25/07* (2006.01)

(52) U.S. Cl.
CPC ....... *F02M 25/0772* (2013.01); *F02M 25/0756* (2013.01); *F02M 25/0773* (2013.01); *F02M 25/0789* (2013.01); *Y02T 10/121* (2013.01)

(58) Field of Classification Search
CPC .......... F02M 25/0771; F02M 25/0772; F02M 25/0773; F02M 25/0787; F02M 25/0788; F02M 25/0794; F02M 25/0756; F02M 25/0753; F16K 31/04; F16K 31/041
USPC ............ 123/568, 18, 568.21, 568.23, 568.24; 251/129.11
See application file for complete search history.

(56) References Cited

U.S. PATENT DOCUMENTS 6,382,195 B1 * 5/2002 Green et al. ............. 123/568.23
6,443,135 B1 9/2002 Dismon et al.
(Continued)

FOREIGN PATENT DOCUMENTS

CN 1641203 A 7/2005
CN 101725439 A 6/2010
(Continued)

OTHER PUBLICATIONS

Machine translation of Detailed Description KR102006029846A, Park et al., Published Jan. 29, 2007, obtained from http://engpat.kipris.or.kr/, pp. 1-11.*

*Primary Examiner* — Lindsay Low
*Assistant Examiner* — Grant Moubry
(74) *Attorney, Agent, or Firm* — Norman B. Thot

(57) ABSTRACT

A motor vehicle exhaust gas recirculation valve arrangement for an exhaust gas recirculation system of an internal combustion engine includes an electric drive motor, an intermediate shaft, an eccentric shaft, and a valve drive. The electric drive motor comprises a motor shaft and a motor pinion. The intermediate shaft comprises an intermediate shaft pinion and an output gear. The output gear is configured to mesh with the motor pinion. The eccentric shaft comprises an eccentric and a drive gear. The drive gear is configured to mesh with the intermediate shaft pinion. A valve drive comprises a valve plate, a valve rod, and a link. The link is configured to have the eccentric engage therein. The intermediate shaft is arranged laterally beside the eccentric shaft so that the eccentric and the link lie beside the drive motor.

4 Claims, 3 Drawing Sheets

(56) References Cited

U.S. PATENT DOCUMENTS

| | | | | |
|---|---|---|---|---|
| 7,124,750 | B2 * | 10/2006 | Tsokonas | 123/568.21 |
| 7,950,623 | B2 * | 5/2011 | Sasaki et al. | 251/129.04 |
| 2003/0000497 | A1 | 1/2003 | Brosseau et al. | |
| 2006/0226385 | A1 | 10/2006 | Kouzu et al. | |
| 2010/0176325 | A1 | 7/2010 | Klipfel et al. | |

FOREIGN PATENT DOCUMENTS

| | | | |
|---|---|---|---|
| DE | 100 02 577 | A1 | 7/2001 |
| DE | 103 36 976 | A1 | 3/2005 |
| DE | 10 2006 031 028 | A1 | 1/2008 |
| EP | 1 270 897 | A2 | 1/2003 |
| EP | 1 270 905 | A2 | 1/2003 |
| EP | 1 526 271 | A1 | 4/2005 |
| EP | 2 172 682 | A1 | 4/2010 |
| FR | 2 947 026 | A1 | 12/2010 |
| JP | 2006-292009 | A | 10/2006 |
| JP | 2009-197765 | A | 9/2009 |
| JP | 2009-243475 | A | 10/2009 |
| KR | 10-2006-0029846 | A | 4/2006 |
| WO | WO 2010/043328 | A1 | 4/2010 |

* cited by examiner

MOTOR VEHICLE EXHAUST-GAS RECIRCULATION VALVE ARRANGEMENT

CROSS REFERENCE TO PRIOR APPLICATIONS

This application is a U.S. National Phase application under 35 U.S.C. §371 of International Application No. PCT/EP2012/054777, filed on Mar. 19, 2012 and which claims benefit to German Patent Application No. 10 2011 001 535.3, filed on Mar. 24, 2011. The International Application was published in German on Sep. 27, 2012 as WO 2012/126876 A1 under PCT Article 21(2).

FIELD

The present invention relates to a motor vehicle exhaust gas recirculation valve arrangement for an internal combustion engine.

BACKGROUND

The formation of $NO_x$ can be reduced in gasoline and Diesel engines with the use of valve arrangements for exhaust gas recirculation. In controlled exhaust gas recirculation, this is achieved by directing a part of the exhaust gas to the intake side via a duct, where it is mixed with fresh gas.

DE 10 2006 031 028 A1 describes a valve arrangement for an exhaust gas recirculation system which comprises a drive motor and an eccentric drive for the stroke operation of a valve rod with a valve plate. The eccentric drive comprises a cam track element and a follower element held at the valve rod. A two-stage spur gear transmission with a plurality of transmission parts is also provided. The drive motor, the transmission parts and the valve rods are arranged side by side in the radial direction, with some transmission parts situated between the drive motor and the valve rod.

One disadvantage of this valve arrangement is the complex design of the various transmission parts, in particular, of the cam track element that is formed as an eccentric cam track configured as a groove-like inside track. The outer side of this cam track element is further provided with a contact surface which is complicated to manufacture and which is configured as a friction surface or as a curved toothing.

The transmission and/or the transmission parts, the drive motor, and the valve rod are arranged side by side in the transverse direction, require much structural space, and do not allow for a modular structure. The large transverse extension in a direction transverse to the valve axis further results in strong oscillations and vibrations of the entire valve arrangement, which results in wear.

SUMMARY

An aspect of the present invention is to provide an exhaust gas recirculation valve arrangement for motor vehicles that is compact and has a favorable center of gravity position.

In an embodiment, the present invention provides a motor vehicle exhaust gas recirculation valve arrangement for an exhaust gas recirculation system of an internal combustion engine which includes an electric drive motor, an intermediate shaft, an eccentric shaft, and a valve drive. The electric drive motor comprises a motor shaft and a motor pinion. The intermediate shaft comprises an intermediate shaft pinion and an output gear. The output gear is configured to mesh with the motor pinion. The eccentric shaft comprises an eccentric and a drive gear. The drive gear is configured to mesh with the intermediate shaft pinion. A valve drive comprises a valve plate, a valve rod, and a link. The link is configured to have the eccentric engage therein. The intermediate shaft is arranged laterally beside the eccentric shaft so that the eccentric and the link lie beside the drive motor.

BRIEF DESCRIPTION OF THE DRAWINGS

The present invention is described in greater detail below on the basis of embodiments and of the drawings in which.

DETAILED DESCRIPTION

Figure 1:
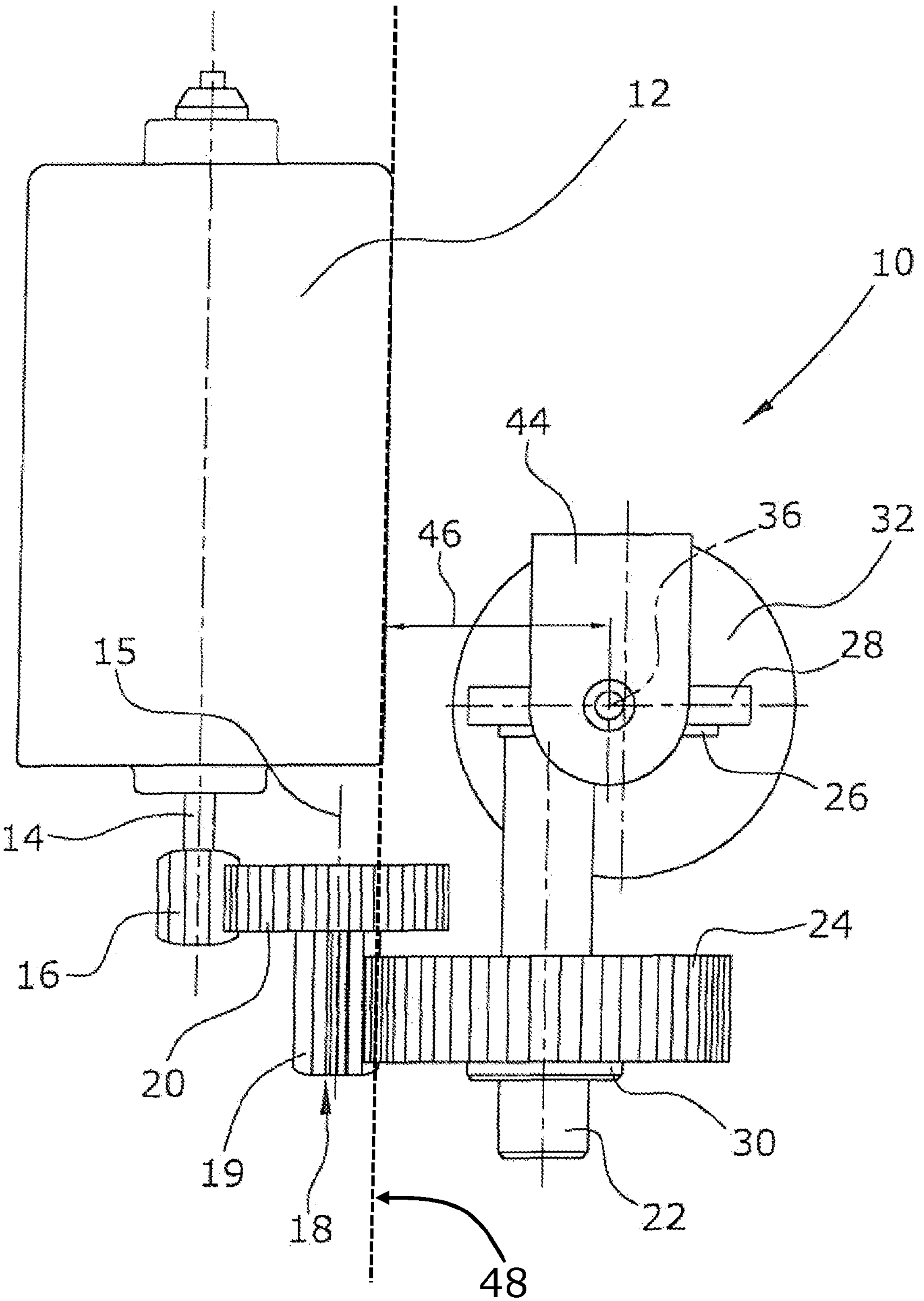
FIG. 1 shows a simplified top plan view on a motor vehicle exhaust gas recirculation valve arrangement of the present invention.

In an embodiment of the present invention, the present exhaust gas recirculation valve arrangement for motor vehicles, intended for the exhaust gas recirculation of an internal combustion engine, comprises an electric drive motor with a motor shaft and a motor pinion arranged on the motor shaft for rotation therewith. The exhaust gas recirculation valve arrangement for motor vehicles further comprises an intermediate shaft with an output gear meshing with the motor pinion, the output gear being connected to the intermediate shaft so as to rotate therewith, and having a diameter larger than the motor pinion of the motor shaft. The intermediate shaft, which is parallel to the motor shaft, is configured as an intermediate shaft pinion and meshes with a drive gear provided on an eccentric shaft. The drive gear, whose diameter is larger than the diameter of the intermediate shaft pinion, is arranged coaxially on the eccentric shaft so that it rotates therewith. A cam-like eccentric is further arranged on the eccentric shaft. The exhaust gas recirculation valve arrangement for motor vehicles further comprises a valve drive with a valve plate, a valve rod and a link, with the eccentric engaging the link. The intermediate shaft is arranged laterally beside the eccentric shaft so that eccentric and the link lie immediately beside the drive motor and within the longitudinal dimension of the drive motor in the direction of the axial line of the drive motor. No other components are present between the link and the drive motor. A simple and compact exhaust gas recirculation valve arrangement for motor vehicles is thus provided, wherein, due to the position of the eccentric and the link, a position of the center of gravity of the entire exhaust gas recirculation valve arrangement for motor vehicles is achieved that is favorable with respect to the valve axis.

In an embodiment of the present invention, the valve rod can, for example, be arranged in the two middle quarters, for example, in the middle third, of the total longitudinal dimension formed by a drive motor housing and a transmission housing. The overall longitudinal dimension is seen in the direction of the axial line of the drive motor. Such an arrangement has the effect that the lever arm between the valve axis and the center of gravity of the exhaust gas recirculation valve arrangement for motor vehicles is kept short, whereby the amplitude of the oscillations of the valve arrangement is relatively small.

In an embodiment of the present invention, the radial distance between the valve rod and the center of gravity of the exhaust gas recirculation valve arrangement for motor vehicles can, for example, be smaller than one quarter of the overall longitudinal dimension formed by the drive motor housing and the transmission housing. For this reason, the valve axis or the valve rod is very close to the center of gravity of the exhaust gas recirculation valve arrangement for motor vehicles so that on the one hand, a favorable position of the center of gravity is achieved and, on the other hand, the amplitude of the oscillation of the entire arrangement is small. The intermediate shaft axis can, for example, be situated within the outer diameter of the drive motor.

In an embodiment of the present invention, a position sensor arrangement, which detects the position of the link, can, for example, be arranged in the transmission housing that encloses the intermediate shaft and the eccentric shaft. The heat-sensitive position sensor arrangement is thus arranged very far from and thermally insulated from the thermally heavily stressed regions of the exhaust gas recirculation valve arrangement for motor vehicles.

The position sensor arrangement may also comprise a linear sensor, for example, a Hall sensor, that detects the translational position of the link. Hall sensors are characterized by their contactless measuring principle, whereby they are mechanically very insensitive while still providing a high measuring accuracy.

The following is a detailed explanation of an embodiment of the present invention with reference to the drawing.

FIG. 1 shows an exhaust gas recirculation valve arrangement 10 for motor vehicles that is intended for installation in the exhaust gas recirculation system of an internal combustion engine. The valve arrangement 10 comprises an electric drive motor 12 formed by a DC electric motor. The drive motor 12 carries a motor pinion 16 on its motor shaft 14, which motor pinion 16 meshes with an output gear 20 connected with an intermediate shaft 18 for rotation therewith. The motor pinion 16 and the output gear 20 are each configured as spur gears, wherein the diameter of the output gear 20 is larger than the diameter of the motor pinion 16 of the motor shaft 14. The output gear 20 and the intermediate shaft 18 are arranged coaxially and are firmly connected with each other and are supported, for example, on a bearing pin (not illustrated).

The intermediate shaft 18 is arranged parallel to the motor shaft 14 and comprises an intermediate shaft pinion 19. By its intermediate shaft pinion 19, the intermediate shaft 18 is in engagement with a drive gear 24 which is larger in diameter than the intermediate shaft pinion 19 and is supported on an eccentric shaft 22 for rotation therewith.

The drive gear 24 and the eccentric shaft 22 are arranged coaxially and are firmly connected with each other. A roller bearing 30 is further provided for supporting the drive gear 24 on the eccentric shaft 22. It is likewise possible to use a slide bearing for supporting purposes. The eccentric shaft 22 is arranged parallel to the rotational axis of the motor shaft 14 and laterally beside the intermediate shaft 18 and carries a cam-shaped eccentric 26 engaging into a link 28. The eccentric 26 and the eccentric shaft 22 are connected for rotation with each other.

The link 28 is part of the valve drive of the motor vehicle exhaust gas recirculation valve arrangement 10, which also comprises a valve rod 34 with a valve plate 32 for opening and closing a valve opening.

The link 28, into which the eccentric 26 engages, is fixedly arranged at the top end of the valve rod 34 which is not illustrated in FIG. 1. By rotation of the eccentric shaft 22, the eccentric 26 applies a force to the link 28, whereby a translational stroke movement is performed in the direction of the valve axis 36 of the valve rod 34.

Since the intermediate shaft 18 is arranged laterally beside the eccentric shaft 22, the eccentric 26 and the link 28 are situated immediately beside the drive motor 12 of the motor vehicle exhaust gas recirculation valve arrangement 10. The intermediate shaft axis 15 of the intermediate shaft 18 is further located within the outer diameter of the drive motor 12. The radial distance 46 of the valve axis 36 or the valve rod 34 to the center of gravity 48 of the overall motor vehicle exhaust gas recirculation valve arrangement 10 is thereby kept very short. No components are provided between the drive motor 12 and the valve drive.

Figure 2:
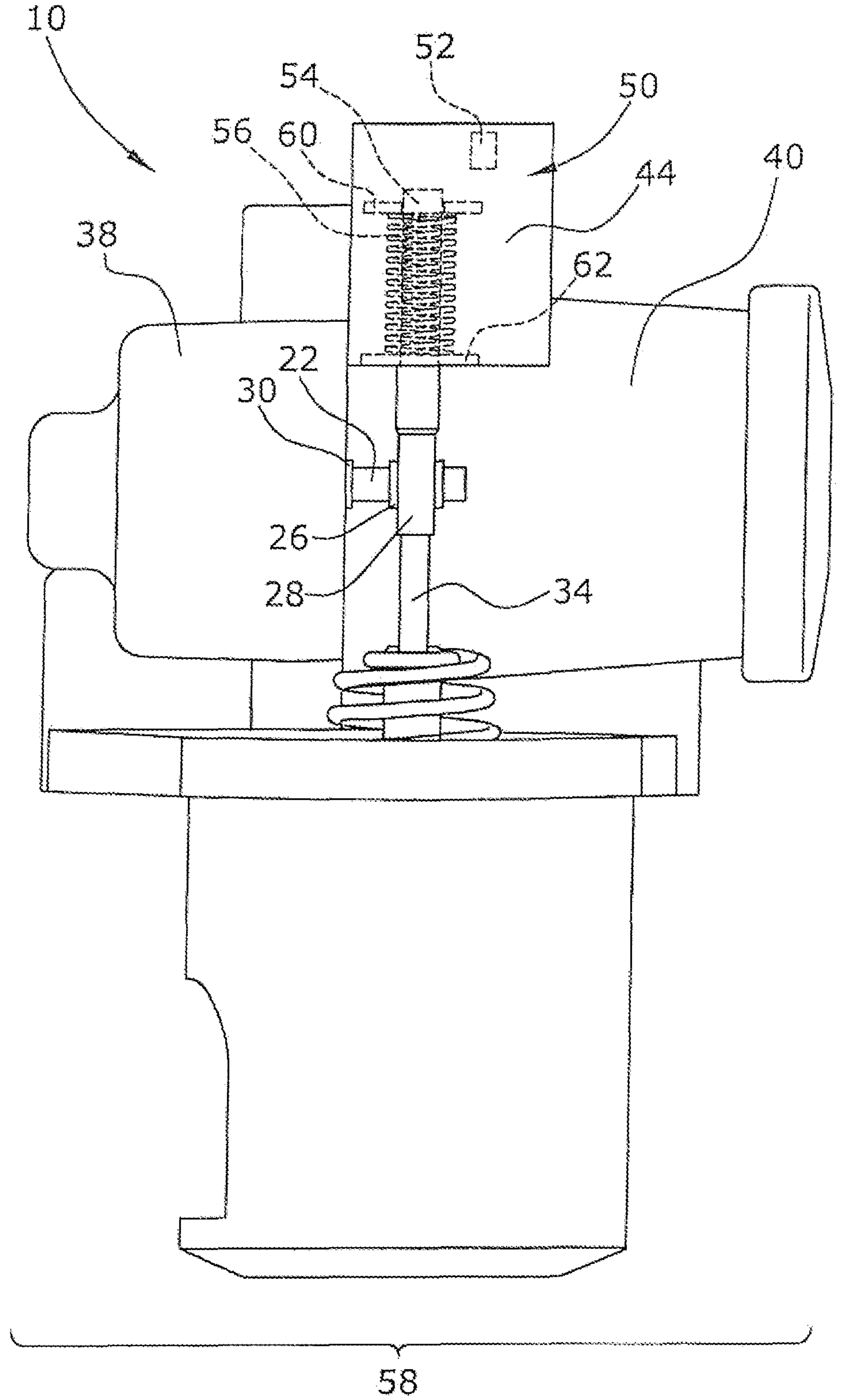
FIG. 2 shows a side elevational view of the motor vehicle exhaust gas recirculation valve arrangement of the present invention.

FIG. 2 is a side elevational view of the motor vehicle exhaust gas recirculation valve arrangement 10, with the transmission parts, i.e., the motor pinion 16, the output gear 20, the intermediate shaft 18 and the drive gear 24, not being illustrated in FIG. 2, since they are arranged inside the transmission housing 38. The eccentric shaft 22 is also partly enclosed by the transmission housing 38. The drive motor 12 in FIG. 2 is further arranged in a drive motor housing 40.

In the axial direction of the drive motor 12, the transmission housing 38 and the drive motor housing 40 define the overall longitudinal dimension 58 of the motor vehicle exhaust gas recirculation valve arrangement 10.

As clearly visible in FIG. 2, the valve drive formed by the link 28 and the valve rod 34 fixedly connected therewith, is situated within the longitudinal dimension of the drive motor housing 40 in the axial direction of the drive motor 12.

In the embodiment illustrated in FIG. 2, the valve rod 34 is arranged in the middle third of the overall longitudinal dimension 58 defined by the drive motor housing 40 and the transmission housing 38.

For an exact position feedback on the translational position of the link 28 or the valve rod 34, a position sensor arrangement 50 is provided that is arranged above the link 28 and at least partly within a sensor housing 44.

The position sensor arrangement 50 comprises a Hall sensor 52, a lifting rod 54 and a helical spring 56. At its end averted from the valve rod 36, the helical spring 56 is supported at a stationary mount 60, while at its end facing the valve rod 34, it is supported at a lifting rod support ring 62. The mount 60 is fastened at the sensor housing 44. The lifting rod support ring 62 is formed on the lifting rod 54 by an enlargement of the circumference. The helical spring 56 biases the lifting rod 54 downward towards the valve rod 34 or the link 28. In the axial orientation of the valve axis 36, the lifting rod 54 rests on the link 28 so that a translational movement of the link 28 or the valve rod 34 causes the lifting rod 54 to move along in a conformal manner. It is likewise conceivable that the lifting rod 54 and the link 28 are fixedly connected with each other. The Hall sensor 52 detects the lifting movement of the lifting rod 54 by determining the presence or absence of the lifting rod end in the detection zone of the Hall sensor 52.

The sensor housing 44 and the transmission housing 38 may be formed by a single housing body.

Figure 3:
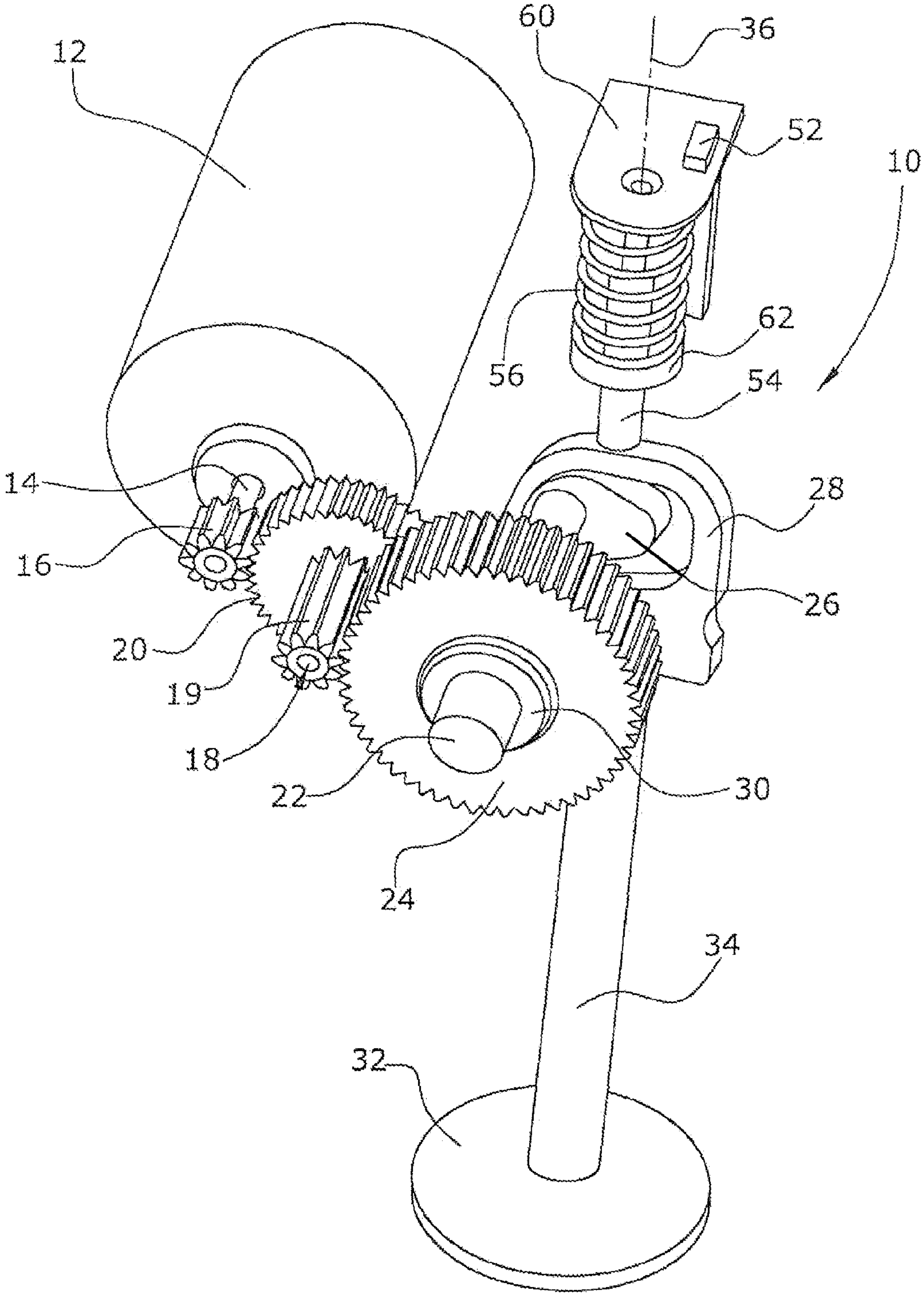
FIG. 3 shows a perspective view of the motor vehicle exhaust gas recirculation valve arrangement of the present invention.

FIG. 3 is a perspective view of the motor vehicle exhaust gas recirculation valve arrangement 10. FIG. 3 again clearly shows the two-stage transmission connection between the motor pinion 16 and the output gear 20 and the intermediate shaft 18 with its intermediate shaft pinion 19 and the drive gear 24, already described in the context of FIG. 1.

FIG. 3 further again illustrates the eccentric shaft 22 on which the drive gear 24 is fixedly supported by means of a roller bearing 30. The eccentric shaft 22 carries the cam-shaped eccentric 26 at its end facing the valve drive.

The lifting rod 54 rests on the link 28, into which the eccentric 26 engages, in the axial direction of the valve axis 36 so that upon a translational movement of the link 28 or the valve rod 34, the lifting rod 54 moves along in a conformal manner.

The mount 60 of sheet metal is fastened at the sensor housing 44 (not illustrated in FIG. 3) and comprises an opening through which the lifting rod 54 passes during a lifting movement. The Hall sensor 52 is further arranged on the mount 60, the sensor detecting the lifting rod 54 when it emerges from the opening.

The motor vehicle exhaust gas recirculation valve arrangement 10 of the present invention makes it possible to realize a very compact, modular and economic arrangement between the transmission, the drive motor and the valve drive. Due to the fact that the eccentric and the link are situated within the longitudinal dimension of the drive motor and that, in addition, a favorable position of the center of gravity is obtained because of the arrangement of the transmission and the drive motor around the valve drive, the amplitude of the oscillations in the motor vehicle exhaust gas recirculation valve arrangement is reduced, whereby the arrangement is less prone to vibrations. This results in less wear of all components and reduces the risk of rupture, in particular, of the valve rod which performs a constant translational movement and may cant or jam when it is bent, which may even cause the rod to break.

The present invention is not limited to embodiments described herein; reference should be had to the appended claims.

What is claimed is:

1. A motor vehicle exhaust gas recirculation valve arrangement for an exhaust gas recirculation system of an internal combustion engine, the motor vehicle exhaust gas recirculation valve arrangement comprising:

an electric drive motor comprising a motor shaft and a motor pinion;

an intermediate shaft comprising an intermediate shaft pinion and an output gear, the output gear being configured to mesh with the motor pinion;

an eccentric shaft comprising an eccentric and a drive gear, the drive gear being configured to mesh with the intermediate shaft pinion;

a valve drive comprising a valve plate, a valve rod, and a link comprising a stationary mount which comprises a position sensor arrangement, the link being configured to have the eccentric engage therein, and the position sensor arrangement being configured to detect a position of the link; and a drive motor housing and a transmission housing which together form an overall longitudinal dimension, wherein, the intermediate shaft is arranged laterally beside the eccentric shaft so that the eccentric and the link lie beside the drive motor, the valve rod is arranged in a middle two quarters of the overall longitudinal dimension, the transmission housing is configured to enclose the intermediate shaft and the eccentric shaft, and the position sensor arrangement comprises a linear sensor configured to detect a translational position of the link.

2. The motor vehicle exhaust gas recirculation valve arrangement as recited in claim 1, wherein the valve rod is arranged in a middle third of the overall longitudinal dimension.

3. The motor vehicle exhaust gas recirculation valve arrangement as recited in claim 1, wherein a radial distance of the valve rod to a center of gravity of the exhaust gas recirculation valve arrangement for motor vehicles is less than a quarter of the overall longitudinal dimension.

4. The motor vehicle exhaust gas recirculation valve arrangement as recited in claim 1, wherein the linear sensor is a Hall sensor.

* * * * *